(12) United States Patent
Yoon et al.

(10) Patent No.: US 11,252,375 B2
(45) Date of Patent: Feb. 15, 2022

(54) ELECTRONIC APPARATUS AND CONTROL METHOD THEREOF

(71) Applicant: SAMSUNG ELECTRONICS CO., LTD., Suwon-si (KR)

(72) Inventors: Daewon Yoon, Suwon-si (KR);
Gohwoon Jeong, Suwon-si (KR);
Daeeun Hyun, Suwon-si (KR);
Sangshin Park, Suwon-si (KR);
Kwansik Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/733,689

(22) Filed: Jan. 3, 2020

(65) Prior Publication Data

US 2020/0221052 A1 Jul. 9, 2020

(30) Foreign Application Priority Data

Jan. 7, 2019 (KR) .......................... 10-2019-0001576

(51) Int. Cl.
*H04N 7/173* (2011.01)
*H04N 21/482* (2011.01)
(Continued)

(52) U.S. Cl.
CPC ..... *H04N 7/17318* (2013.01); *H04N 21/4227* (2013.01); *H04N 21/42204* (2013.01);
(Continued)

(58) Field of Classification Search
CPC .............. H04N 7/17318; H04N 21/47; H04N 21/42204; H04N 21/4227; H04N 21/438;
(Continued)

(56) References Cited

U.S. PATENT DOCUMENTS

2002/0116713 A1 8/2002 Mukai et al.
2003/0061618 A1 3/2003 Horiuchi et al.
(Continued)

FOREIGN PATENT DOCUMENTS

KR 10-2008-0063167 7/2008
KR 10-2010-0034285 4/2010
(Continued)

OTHER PUBLICATIONS

International Search Report and Written Opinion dated Apr. 23, 2020 in counterpart International Patent Application No. PCT/KR2020/000058.
(Continued)

*Primary Examiner* — Alazar Tilahun
(74) *Attorney, Agent, or Firm* — Nixon & Vanderhye P.C.

(57) ABSTRACT

An electronic apparatus including: a display; a signal receiver including circuitry configured to receive a broadcast signal; a processor configured to control the electronic apparatus to: obtain first information about a broadcasting schedule corresponding to a plurality of channels provided through the broadcast signal, determine a recommendation level of a program corresponding to a time unit section having a predetermined time length with regard to a plurality of programs of the plurality of channels based on the obtained first information, obtain second information about a broadcasting schedule of the programs selected based on the determined recommendation level among the plurality of programs, and process the broadcasting schedule of the selected programs to be displayed on the display based on the obtained second information.

20 Claims, 14 Drawing Sheets

(51) Int. Cl.
*H04N 21/438* (2011.01)
*H04N 5/445* (2011.01)
*H04N 21/4227* (2011.01)
*H04N 21/47* (2011.01)
*H04N 21/422* (2011.01)

(52) U.S. Cl.
CPC ........... *H04N 21/438* (2013.01); *H04N 21/47* (2013.01); *H04N 21/482* (2013.01)

(58) Field of Classification Search
CPC ............. H04N 21/482; H04N 21/4668; H04N 21/4826; H04N 21/4583; H04N 21/458
See application file for complete search history.

(56) References Cited

U.S. PATENT DOCUMENTS

| | | | |
|---|---|---|---|
| 2009/0064228 A1 | 3/2009 | Lin | |
| 2009/0092371 A1* | 4/2009 | Miyaki | H04H 20/106 386/278 |
| 2009/0271826 A1 | 10/2009 | Lee et al. | |
| 2011/0214154 A1* | 9/2011 | Nagano | H04N 21/4532 725/87 |
| 2013/0268957 A1 | 10/2013 | Ly et al. | |
| 2014/0229990 A1* | 8/2014 | Lee | H04N 21/25891 725/46 |
| 2014/0259037 A1* | 9/2014 | Belyaev | H04N 21/44008 725/14 |
| 2014/0282656 A1* | 9/2014 | Belyaev | H04N 21/251 725/14 |

FOREIGN PATENT DOCUMENTS

| | | |
|---|---|---|
| KR | 10-2011-0009906 | 1/2011 |
| KR | 10-2013-0057611 | 6/2013 |
| KR | 10-1435921 | 9/2014 |
| KR | 10-2015-0055410 | 5/2015 |
| KR | 10-2015-0069963 | 6/2015 |
| WO | 2008/147069 | 12/2008 |
| WO | 2009/120010 | 10/2009 |

OTHER PUBLICATIONS

Extended Search Report and Written Opinion dated May 4, 2020 in counterpart European Patent Application No. 20150314.1.

* cited by examiner

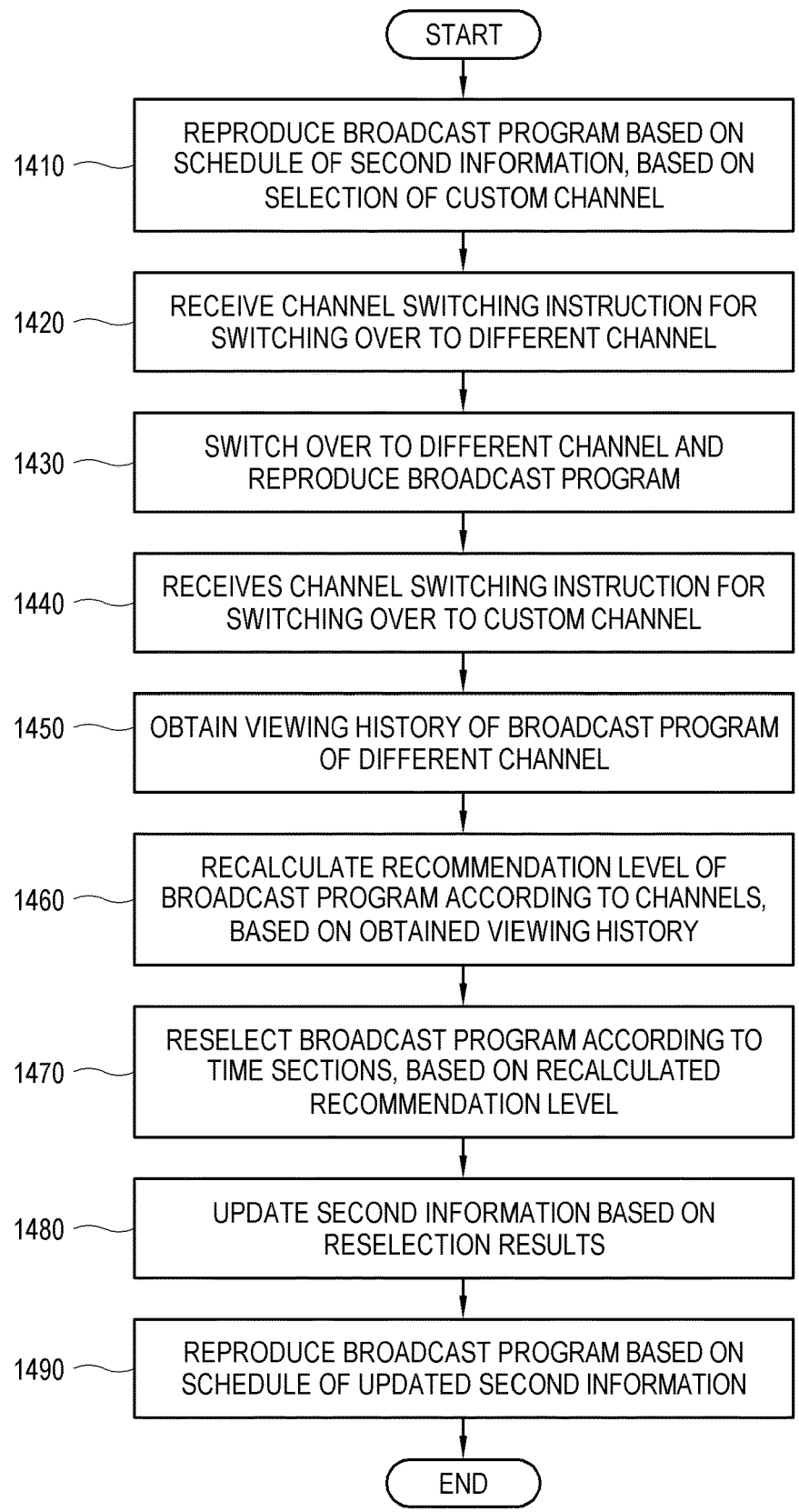

ELECTRONIC APPARATUS AND CONTROL METHOD THEREOF

CROSS-REFERENCE TO RELATED APPLICATION

This application is based on and claims priority under U.S.C. § 119 to Korean Patent Application No. 10-2019-0001576, filed on Jan. 7, 2019, in the Korean Intellectual Property Office, the disclosure of which is incorporated by reference herein in its entirety.

BACKGROUND

Field

The disclosure relates to an electronic apparatus capable of processing a broadcast signal received from a broadcast content provider and reproducing broadcast program content of the broadcast signal and a control method thereof, and for example, to an electronic apparatus which recommends and guides a program content that suits a user among a plurality of pieces of broadcast program content receivable through a plurality of broadcast channels and a control method thereof.

Description of Related Art

To compute and process predetermined information in accordance with certain processes, an electronic apparatus basically includes a processor, a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus is classified into an apparatus including a display panel to display an image based on processed image data, and an apparatus including no display panels. As an example of the image processing apparatus to which general users can have easy access, there are a television (TV) and a set-top box which receives and processes a broadcast signal to display an image based on broadcast content.

The broadcast content provided from a broadcast content provider corresponding to a broadcast channel selected by a user to the image processing apparatus in the form of the broadcast signal is reproducible in two different modes. One mode for the broadcast content is a live channel mode in which program content corresponding to a channel is reproducible in time previously fixed by the provider. The other mode for the broadcast content is a video on demand (VOD) mode in which time to reproduce program content is not fixed so that a user can select and view desired program content anytime.

In a case of the live channel mode, there are many methods of recommending pieces of currently consumable program content to a user. The image processing apparatus may for example combine pieces of schedule information about broadcast programs respectively received through the plurality of broadcast channels, or search broadcasting schedule information about broadcast programs corresponding to channels, e.g., an electronic program guide (EPG), received from a separate server. Further, the image processing apparatus may guide program content of which a genre or a series has been viewed by a user many times. Further, the server may select broadcast content based on viewing information collected from many users, and recommend the selected broadcast content to the image processing apparatus.

However, such methods may have problems as follows. The EPG scheduled by the provider does not reflect a user's preference, and a user needs to manually select and view preferred broadcast content in the EPG. Although broadcast content is recommended based on a user's viewing history, a user needs to inconveniently select whether to view the recommended content. When the recommended content is given through a live channel and has already been broadcasted at a recommendation point in time, a user may miss a part of the recommended content. When the recommended content is broadcasted later, a user has to inconveniently wait until the recommended content is broadcasted.

In this regard, it is desirable that an image processing apparatus should identify program content, which suits a user, among pieces of broadcast content provided in the live channel mode and provide the program content in a mode convenient for a user's selection.

SUMMARY

Embodiments of the disclosure provide and image processing apparatus that can provide the custom channel in which a user's preference is reflected in real time.

According to an example embodiment of the disclosure, an electronic apparatus is provided, the electronic apparatus including: a display; a signal receiver comprising signal receiving circuitry configured to receive a broadcast signal; a processor configured to control the electronic apparatus to: obtain first information about a broadcasting schedule corresponding to a plurality of channels provided through the broadcast signal, determine a recommendation level of a program corresponding to a time unit section having a predetermined time length with regard to a plurality of programs of the plurality of channels based on the obtained first information, obtain second information about a broadcasting schedule of the programs selected based on the determined recommendation level among the plurality of programs, and process the broadcasting schedule of the selected programs to be displayed on the display based on the obtained second information.

The processor may control the electronic apparatus to select the program, of which the recommendation level is relatively high, among the plurality of programs corresponding to the time unit section.

The processor may control the electronic apparatus to identify the program, of which a reproducing start point in time or a broadcasting start point in time is present in the time unit section, as corresponding to the time unit section.

The processor may control the electronic apparatus to derive the second information with respect to one selected between the selected programs which are adjacent to each other in time and which have an overlap section.

The processor may control the electronic apparatus to determine the recommendation level based on use history information about programs that have been viewed by a user.

The processor may control the electronic apparatus to determine the recommendation level based on a user's preference and a length of a gap between programs.

The processor may control the electronic apparatus to obtain the second information by selecting a combination of programs between which the minimum gap is present during a preset time section.

The processor may control the electronic apparatus to arrange and reproduce additional content in the gap.

The processor may control the electronic apparatus to obtain a plurality of pieces of second information based on programs selected under various time lengths of the time unit section, and select one among the plurality of pieces of second information.

The processor may control the electronic apparatus to assign the second information to a channel not used by the broadcast signal among the plurality of channels, and automatically switch to the channel assigned with the second information to display the program based on the schedule of the second information.

The processor may be configured to control the electronic apparatus to: reproduce a first program based on selection of an item of the first program corresponding to a current point in time, provide content related to a second program and different from the broadcast signal based on selection of an item of the second program corresponding to a past point in time, and display a user interface (UI) for scheduled recording or scheduled viewing of a third program based on selection of an item of the third program corresponding to a future point in time.

According to another example embodiment of the disclosure, a method of controlling an electronic apparatus is provided, the method of controlling an electronic apparatus, including: obtaining first information about a broadcasting schedule corresponding to a plurality of channels provided through a broadcast signal; determining a recommendation level of a program corresponding to a time unit section having a predetermined time length with regard to a plurality of programs of the plurality of channels based on the obtained first information; obtaining second information about a broadcasting schedule of the programs selected based on the determined recommendation level among the plurality of programs; and processing the broadcasting schedule of the selected programs to be displayed based on the obtained second information.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 14 is a flowchart illustrating an example method of an image processing apparatus updating second information when channel switching occurs while being tuned to a custom channel according to an embodiment of the disclosure.

DETAILED DESCRIPTION

Below, various example embodiments will be described in greater detail with reference to accompanying drawings. Further, the example embodiments described with reference to the accompanying drawings are not exclusive to each other unless otherwise mentioned, and a plurality of embodiments may be selectively combined within one apparatus. The combination of these plural embodiments may be discretionally selected and applied to realize the present disclosure by a person having an ordinary skill in the art.

In the description of the embodiments, an ordinal number used in terms such as a first element, a second element, etc. is used to describe a variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
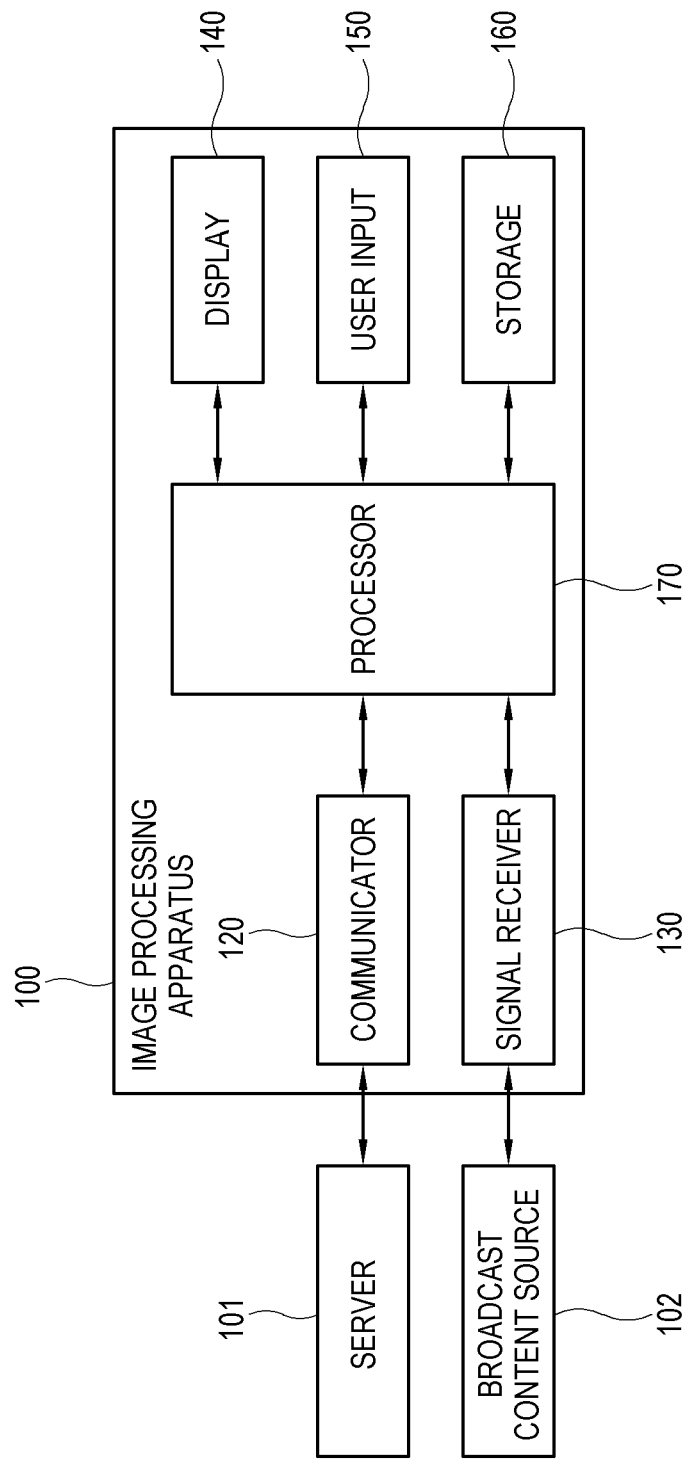
FIG. 1 is a block diagram illustrating an example electronic apparatus according to an embodiment of the disclosure.

FIG. 1 is a block diagram illustrating an example electronic apparatus according to an embodiment of the disclosure.

As shown in FIG. 1, an electronic apparatus according to an embodiment of the disclosure may include an image processing apparatus 100 capable of receiving a broadcast signal from a broadcast content source 102. This embodiment describes that the image processing apparatus 100 is a television (TV), but the image processing apparatus 100 may be embodied as one of any kinds of apparatuses capable of processing a broadcast signal to display a broadcast image. Besides the TV, the image processing apparatus 100 may for example, and without limitation, include a set-top box, a portable multimedia device, a smartphone, a tablet computer, a mobile phone, a computer, an electronic frame, a digital signage, a wearable device, etc.

The image processing apparatus 100 includes a communicator (e.g., including communication circuitry) 120 configured to communicate with an external apparatus, a signal receiver (e.g., including signal receiving circuitry) 130 configured to receive a broadcast signal, a display 140 configured to display an image, a user input (e.g., including input circuitry) 150 configured to receive a user's input, a storage 160 configured to store data, and a processor (e.g., including processing circuitry) 170 configured to process the data.

The communicator 120 may, for example, include an interactive communication circuit that includes at least one of, for example, and without limitation, a communication module including communication circuitry, a communication chip including communication circuitry, etc. corresponding to various wired and wireless communication protocols. For example, the communicator 120 may be embodied by a wireless communication module including various wireless communication circuitry configured to perform wireless communication with an access point (AP) through Wi-Fi, or a local area network (LAN) card connected to a router or a gateway by a wire. For example, the communicator 120 may communicate with a server 101 on a network, thereby receiving a data packet from the server 101.

The signal receiver 130 may include various signal receiving circuitry and may be one-to-one or one-to-many connected to a predetermined external apparatus, thereby receiving or outputting data with regard to the corresponding external apparatus. The signal receiver 130 may include, for example and without limitation, a high definition multimedia interface (HDMI) port, a display port, a universal serial bus (USB) port, and the like connectors or ports according to preset transmission standards. Further, when the signal receiver 130 is configured to receive a broadcast signal from the broadcast content source 102 such as a transmitter of a broadcasting station, the signal receiver 130 may include an antenna or circuit for receiving a broadcast signal, and a tuner for seeking a first broadcast signal. In this example the signal receiver 130 may be configured to receive a broadcast signal, but the communicator 120 may be used to receive a broadcast signal in accordance with media characteristics of the broadcast signal.

The display 140 may include a display panel capable of displaying an image on a screen. The display panel may be provided to have a light receiving structure such as a liquid crystal type, or a self-emissive structure such as an organic light emitting diode (OLED) type. The display 140 may include an additional element according to the structures of the display panel. For example, when the display panel is the liquid crystal type, the display 330 includes a liquid crystal display panel, a backlight unit configured to emit light, a panel driving substrate configured to drive liquid crystal of the liquid crystal display panel, etc.

The user input 150 may include various input interfaces including input circuitry through which a user can make an input. The user input 150 may be variously configured according to the kinds of image processing apparatus 100, and may for example include a mechanical or electronic button of the image processing apparatus 100, a remote controller separated from image processing apparatus 100, a touch pad, a touch screen installed in the display 140, etc.

The storage 160 may be accessed by the processor 170, and may perform operations such as reading, recording, modifying, deleting, updating, etc. for data under control of the processor 170. The storage 160 may include, for example, and without limitation, a flash memory, a hard disk drive (HDD), a solid state drive (SSD), and the like nonvolatile memory in which data is retained regardless of whether power is supplied or not; and a buffer, a random access memory (RAM) and the like volatile memory to which processing data is loaded.

The processor 170 may include various processing circuitry, including, for example, and without limitation, one or more hardware processors achieved, for example, by a central processing unit (CPU), a chipset, a buffer, a circuit, etc. which may be mounted on a printed circuit board (PCB). The processor 170 may be designed as a system on chip (SoC). The processor 170 may include various modules corresponding to various processes, such as a demultiplexer, a decoder, a scaler, an audio digital signal processor (DSP), an amplifier, etc., and some or all of the modules may be achieved by the SoC. For example, a demultiplexer, a decoder, a scaler, and the like module related to an image process may be achieved as an image processing SoC, and an audio DSP may be achieved as a chipset separated from the SoC.

In an example embodiment, a mode of providing a broadcast signal from the broadcast content source 102 by a provider of broadcast content is based on a live channel mode in which time of reproducing program content corresponding to a channel is previously fixed. The signal receiver 130 receives a broadcast signal in the live channel mode, and the processor 170 processes the broadcast signal and displays a broadcast image on the display 140. In the live channel mode, the broadcast signal may include a plurality of channels, and broadcast programs of each channel are scheduled on a timeline. For example, at a predetermined point in time, the processor 170 may reproduce one broadcast program among the broadcast programs of each of the plurality of channels included in the broadcast signal.

The processor 170 may select broadcast programs, which suit a user, among the broadcast programs of the plurality of channels provided through the broadcast signal, and gives a guide to a user. Below, such a method will be described in greater detail.

Figure 2:
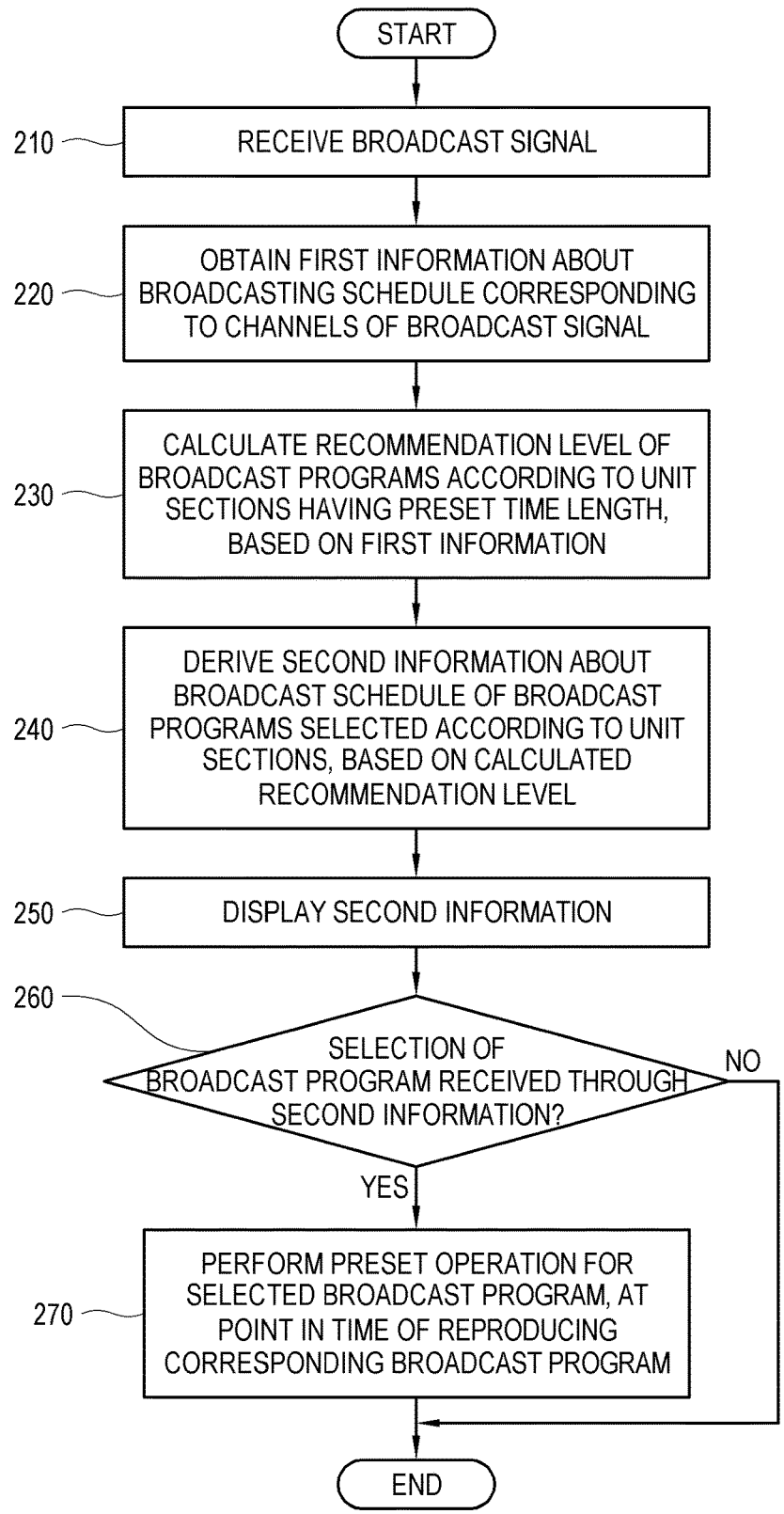
FIG. 2 is a flowchart illustrating an example method of an image processing apparatus recommending broadcast programs according to an embodiment of the disclosure.

FIG. 2 is a flowchart illustrating an example method of recommending broadcast programs by an image processing apparatus according to an embodiment of the disclosure.

As shown in FIG. 2, the following operations may be carried out by the processor of the image processing apparatus.

At operation 210 the image processing apparatus receives a broadcast signal. In an example embodiment, the broadcast signal may be a signal given in the live channel mode, and time of reproducing a broadcast program corresponding to a channel has been previously fixed by a provider.

At operation 220 the image processing apparatus obtains first information about broadcasting schedules of broadcast signals corresponding to a plurality of channels of the broadcast signal. The first information may refer, for example, to information about time schedules of the broadcast programs in a plurality of channels provided through a broadcast signal of a live channel, and may for example include an electronic program guide (EPG).

At operation 230 the image processing apparatus calculates (e.g., determines) a recommendation level of each broadcast program according to unit sections having a preset length of time, based on the first information. The recommendation level may be represented with a quantified numerical value for comparison between the broadcast programs, and may be calculated or determined based on a user's viewing history.

At operation 240 the image processing apparatus derives second information about the broadcasting schedules of the broadcast programs selected according to the unit sections based on the calculated recommended level. For example, the second information shows the schedules of the broadcast programs selected according to the unit sections among the broadcast programs according to the plurality of channels recorded in the first information.

At operation 250 the image processing apparatus displays the second information. The second information may be displayed in the form of various user interfaces (UI), without being limited to a specific displaying form. The image processing apparatus may display the second information under a specific condition. For example, while a broadcast image of any broadcast program is not being currently displayed, the second information may be displayed instead of a power-off screen or a standby screen. The image processing apparatus may display the second information in a certain area of a screen even though the broadcast image is being displayed.

At operation 260 the image processing apparatus identifies whether a selection of the broadcast program through the displayed second information is received.

When a user selects a certain broadcast program through the second information, at operation 270 the image processing apparatus performs a preset operation for the selected broadcast program at a point in time of reproducing the corresponding broadcast program. On the other hand, when any broadcast program is not selected in the second information, the image processing apparatus may maintain a current displaying state or stand by until a new operation event occurs.

The broadcast program may correspond to one among three cases that a broadcast program is being currently reproducible, a broadcast program has already been reproduced at a previous point in time, and a broadcast program will be reproduced in future. The operations performed in the image processing apparatus may be varied depending on which of three cases the selected broadcast program corresponds to. In this regard, more detailed descriptions will be made below.

The image processing apparatus may divide the timeline into the plurality of unit sections in the first information about the schedules of the broadcast programs corresponding to the channel according to the timeline, selects the broadcast program based on the recommendation level according to the unit sections, and derives the second information about the schedules of the broadcast programs according to the selection results. Thus, the image processing apparatus may guide a user to the broadcast program closer to the user's preference than the broadcast program recommended based on the first information.

Below, a detailed method of deriving the second information based on the first information by the image processing apparatus will be described.

Figure 3:
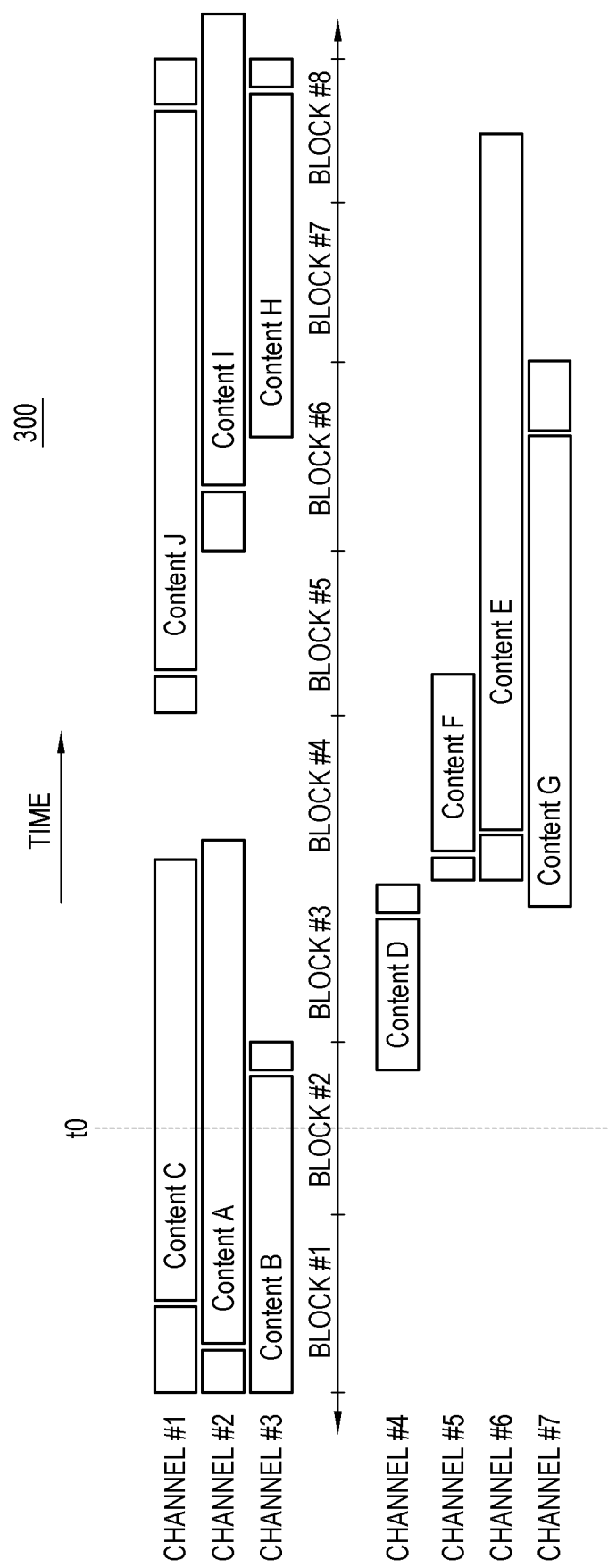
FIG. 3 is a diagram illustrating an example of dividing a timeline of first information into a plurality of unit sections in an image processing apparatus according to an embodiment of the disclosure.

FIG. 3 is a diagram illustrating an example of dividing a timeline of first information into a plurality of unit sections by an image processing apparatus according to an embodiment of the disclosure.

As shown in FIG. 3, the image processing apparatus obtains first information about broadcasting schedules of broadcast programs of a plurality of channels according to the timeline. The image processing apparatus may use various methods to obtain the first information 300. For example, the image processing apparatus may for example extract the first information 300 from a broadcast signal including the first information 300, or may receive the first information 300 from a server.

In the first information 300, the broadcasting schedules of broadcast program content to be sequentially broadcasted in each channel for a predetermined period of time are shown on a timeline, with respect to a plurality of channels in a broadcast signal. The first information 300 shows what broadcast program or content is being broadcasted or provided in what channel at a certain point in time. For example, the first information 300 in this embodiment shows that content C, content A and content B are being respectively broadcasted or provided in a channel #1, a channel #2 and channel #3 at a point in time to.

A broadcast signal is receivable through a plurality of channels, and a broadcast program is included in the broadcast signal corresponding to each channel. Therefore, the broadcast programs being broadcasted at a predetermined point in time are provided corresponding to the channels. With these characteristics of the broadcast signal, when the image processing apparatus selects the broadcast programs, which suit a user, according to the timeline, considerations may, for example, be as follows.

The broadcast programs corresponding to the channels may be different from one another in a start point in time at which broadcasting starts and an end point in time at which broadcasting ends. Therefore, it is not easy to configure such different broadcast programs in one timeline.

For example, a start point in time of content G in a channel #7 is earlier than the end point in time of the content A in the channel #2, and therefore the reproducing section of the content A and the reproducing section of the content G are overlapped in a section between these two points in time. Further, an end point in time of content D substantially coincides with the start point in time of the content G, and therefore the content G is reproducible immediately after the reproduction of the content D ends. However, a start point in time of content E is present after a predetermined period of time from the end point in time of the content D, and therefore neither the content D nor the content E is reproducible in a section between these two points in time.

Because the broadcast programs are all different in the start point in time, the end point in time and a running time, there is a criterion for how to select the broadcast program which suits a user's preference. For example, the image processing apparatus may simply select a broadcast program based on a user's preference. However, in this case, it may be difficult to select a plurality of broadcast programs reproducible for a predetermined period of time because of a relationship between the reproducing sections of the broadcast programs described as above.

Taking these points into account, the image processing apparatus selects a recommended broadcast program based on a timeline divided into a plurality of unit blocks or unit sections each having the same time width. For example, the timeline of the first information may correspond to 24 hours, and the time width of the unit section may correspond to 30 minutes. The image processing apparatus divides the timeline of 24 hours into the plurality of time sections each having the time width of 30 minutes. This embodiment shows that the timeline is divided into eight time-sections from a block #1 to a block #8.

The image processing apparatus may select the broadcast programs corresponding to the time sections. The image processing apparatus may select a broadcast program of which a start point in time is present in a certain time section, e.g., a broadcast program which starts in the certain time section, as a broadcast program corresponding to the corresponding time section. For example, the broadcast program corresponding to the time section of the block #1 includes the content C, the content A, and the content B. The broadcast program corresponding to the time section of the block #2 includes the content D. The broadcast program corresponding to the time section of the block #6 includes content I, and content H.

In such a manner, the image processing apparatus identifies the broadcast programs corresponding to the time sections, among the plurality of broadcast programs on the timeline of the first information 300. The image processing apparatus calculates a preference or recommendation level based on a method previously set with regard to the broadcast programs corresponding to the time sections.

Below, a method that the image processing apparatus selects a recommended broadcast program in a time section based on recommendation levels of a plurality of broadcast program will be described.

Figure 4:
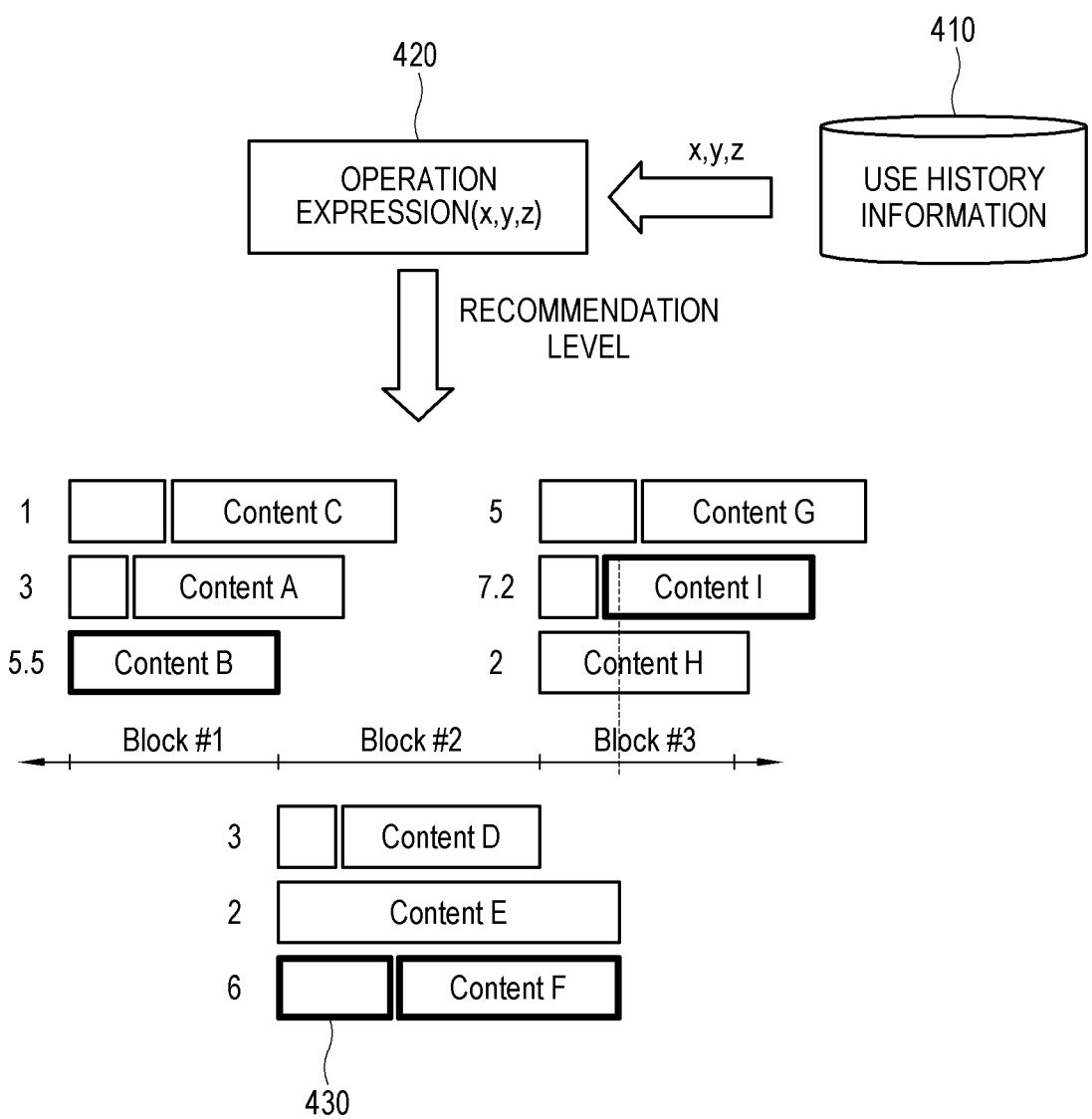
FIG. 4 is a diagram illustrating an example method of selecting a broadcast program based on a recommendation level among broadcast programs corresponding to a certain time section in an image processing apparatus according to an embodiment of the disclosure.

FIG. 4 is a diagram illustrating an example method of selecting a broadcast program based on a recommendation level among broadcast programs corresponding to a certain time section by an image processing apparatus according to an embodiment of the disclosure.

As shown in FIG. 4, the image processing apparatus calculates recommendation levels of the broadcast programs, compares the recommendation levels of the broadcast programs in the channels corresponding to each time section, and selects a broadcast program of which the recommendation level is highest in the time section.

For example, there are various methods of calculating the recommendation level of the broadcast program. For example, the image processing apparatus may call use history information 410 about the broadcast programs that have been viewed in the image processing apparatus by a user. The use history information 410 may include, for example, various pieces of information about a user's viewing history, and may for example include cumulative time that a user have spent in viewing a certain broadcast program, the number of times that you have viewed a certain broadcast program, the number of times or cumulative time that a user have viewed or have spent in viewing a certain channel, the number of times or cumulative time that a user have viewed or have spent in viewing the broadcast program according genres, etc.

The image processing apparatus may obtain one or more parameters about a broadcast program from the use history information 410, and may acquire an operation result from a preset operation expression 420 based on the obtained parameter. The image processing apparatus may identify the acquired operation result as the recommendation level of the broadcast program.

For example, the image processing apparatus may obtain a value x of a cumulative time in viewing a certain broadcast, a value y of the number of times of viewing the broadcast program, and a value z of whether the channel of the broadcast program is preferred, from the use history information 410. The image processing apparatus may substitute the obtained values x, y and z into the operation expression 420 and may solve the operation expression 420, thereby obtaining the recommendation level of the corresponding broadcast program. The operation expression 420 may have various forms depending on designs. As a simple example, the operation expression 420 may be represented as $f(x,y,z)=x*W1+y*W2+z*W3$, where W1, W2, and W3 refer to preset weights. The image processing apparatus may calculate the recommendation level with respect to each broadcast program.

The image processing apparatus may select a broadcast program, of which the recommendation level is highest, among the corresponding broadcast programs according to the time sections. For example, the content B has the highest recommendation level of '5.5' among the content C, the content A and the content B corresponding to the time section of the block #1. The content F has the highest recommendation level of '6' among the content D, the content E and the content F corresponding to the time section of the block #2. The content I has the highest recommendation level of '7.2' among the content G, the content I and the content H corresponding to the time section of the block #3.

When the broadcast programs are selected corresponding to the time sections, the image processing apparatus may arrange the broadcast programs according to the time sections to thereby generate the second information. In terms of generating the second information, additional considerations may, for example, be as follows.

A gap 430 may be generated as much as a predetermined period of time between the end point in time of the content B in the block #1 and the start point in time of the content F in the block #2. Thus, content separated from the broadcast program provided by the broadcast signal, for example, additional content such as an advertisement having a short running time provided by a server may be arranged in the gap 430. The image processing apparatus arranges the separate additional content in the gap 430, so that the corresponding additional content can be reproduced in between the content B and the content F when the broadcast program is reproduced based on the second information.

The end point in time of the content F in the block #2 is later than the start point in time of the content I in the block #3. In this case, a last reproducing section of the content F and an early reproducing section of the content I are overlapped. In this case, the image processing apparatus may use various methods including, for example, some methods as follows.

The image processing apparatus may select both the content F and the content I, and designate one of the content F and the content I as being reproduced in the reproducing section where the content F and the content I are overlapped. For example, the image processing apparatus may designate the content I as being reproduced immediately after the reproduction of the content F ends, or may designate the content I as being switched from the content F and reproduced when it is at the start point in time of reproducing the content I while the content F is being reproduced.

The image processing apparatus may select the content F, of which reproduction precedes that of the content I, between the content F and the content I, and may not select the content I. In addition, the image processing apparatus may select the broadcast program of the next time section in the block #3, and may arrange the gap 430 in between the content F and the selected broadcast program.

The image processing apparatus may select the broadcast program having the highest recommendation level among the broadcast programs having the start points in time after the end point in time of the content F within the block #3. In an example embodiment, the content G having the recommendation level of '5' may be selected.

The image processing apparatus may select the content I having a relatively high recommendation level between the content F in the block #2 and the content I in the block #3, which have an overlap running time, and may not select the content F having a relatively low recommendation level.

By performing the foregoing methods with regard to all the time sections of the first information, the image processing apparatus may derive the second information.

Even after the second information is generated, the image processing apparatus may collect a user's use history (e.g., a viewing history of broadcast programs according to channels) in real time or periodically, recalculate the recommendation levels of the broadcast programs based on the collected use history, and update the second information with the recalculated results.

For example, a user views a broadcast program of a channel while switching many channels. When a history of broadcast programs, viewing time, etc. of channels viewed by a user are collected, the image processing apparatus may recalculate recommendation levels by adjusting parameters of the broadcast programs based on the collected history. The broadcast program having the highest recommendation level may be changed according to the time sections. For example, when the content G has a recalculated recommendation level of '8', the broadcast program having the highest recommendation level in the time section of the block #3 is not the content I but the content G.

The image processing apparatus reflects a recalculation result in the previously stored second information by changing the recommended broadcast program of the block #3 from the content I into the content G within, thereby updating the second information. In the future, the image processing apparatus may provide various services based on the updated second information. Descriptions about such services will be provided below.

Below, an example of the second information will be described.

Figure 5:
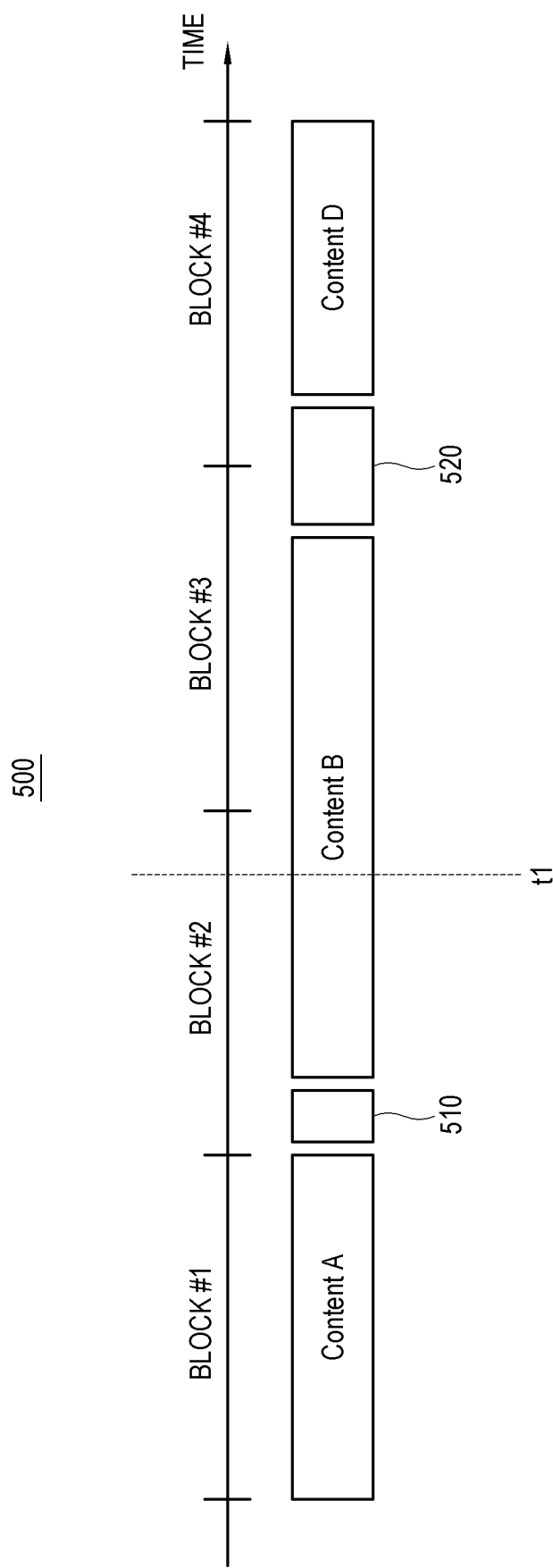
FIG. 5 is a diagram illustrating example second information referenced by an image processing apparatus according to an embodiment of the disclosure.

FIG. 5 is a diagram illustrating example second information referenced by an image processing apparatus according to an embodiment of the disclosure.

As shown in FIG. 5, the image processing apparatus selects the broadcast programs having the highest recommendation level according to the time sections, and generates second information 500 showing the schedules of the broadcast programs recommended according to the time sections. In an example embodiment, the second information 500 shows the content A corresponding to the time section of the block #1, the content B corresponding to the time section of the block #2, and the content D corresponding to the time section of the block #4 as time passes. In the case of the block #3, the content B of the block #2 is arranged in the time section of the block #3 by the method described in the foregoing embodiment.

Between two broadcast programs adjacent to each other in time, there are gaps 510 and 520 between the broadcast programs unless an end point in time of a preceding broadcast program coincides with a start point in time of a following broadcast program. The gaps 510 and 520 may refer, for example, to sections in which separately receivable content may be providable besides a broadcast program provided by the broadcast signal.

When the second information 500 is derived as above, the image processing apparatus may use the second information 500 by various methods. For example, the image processing apparatus may set a custom channel customized for a user based on the second information 500, to reproduce broadcast programs according to the schedules of the second information 500. The image processing apparatus has a channel map in which channel numbers are designated corresponding to the channels for the broadcast signals. However, there are reserve channels which are not assigned to the channels for the broadcast signals among the channel numbers of the channel map. The image processing apparatus may designate one of such reserve channels as the custom channel.

When a user selects the custom channel, the image processing apparatus may be tuned to a broadcast signal based on the schedule designated in the second information 500 and reproduces a broadcast program. When a user switches a certain channel over to the custom channel at a predetermined point in time t1, the image processing apparatus processes the content B of the channel designated in the second information 500 with respect to the point in time t1.

As another method of using the second information 500, the image processing apparatus may display the second information 500 to guide a user in a standby mode. During the standby mode, the image processing apparatus may typically turn off a screen without displaying a broadcast image or display a separately provided standby screen. In an example embodiment, the image processing apparatus displays the standby screen including the second information 500.

Below, an example in which the image processing apparatus displays the standby screen including the second information 500 will be described in greater detail.

Figure 6:
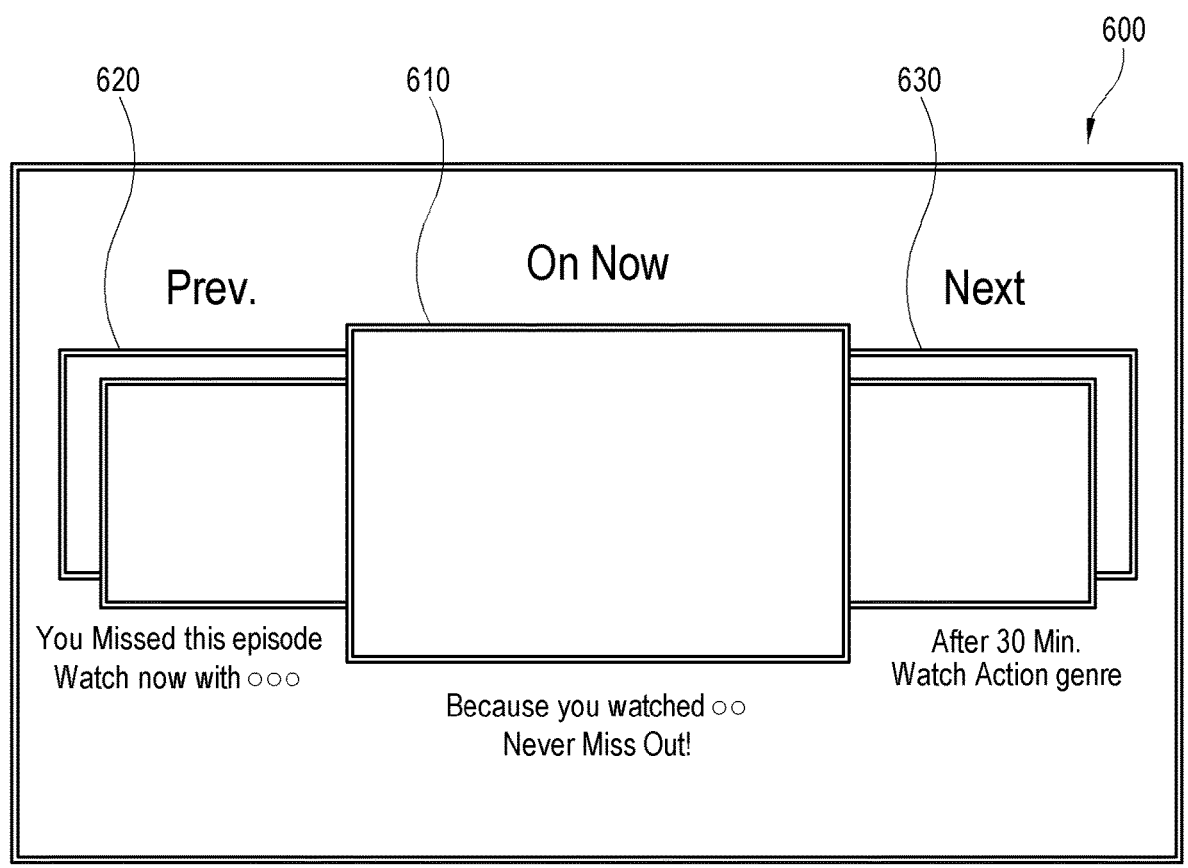
FIG. 6 is a diagram illustrating an example user interface (UI) for second information displayed by an image processing apparatus according to an embodiment of the disclosure.

FIG. 6 is a diagram illustrating an example user interface (UI) for second information displayed by an image processing apparatus according to an embodiment of the disclosure.

As shown in FIG. 6, the image processing apparatus identifies current time in the standby mode, and displays a UI 600, which shows the schedules of the broadcast programs designated in the second information, on a screen based on the identified current time. As described above, broadcasting schedules of a plurality of broadcast programs are designed in the second information. With respect to a current point in time, the broadcast programs designated in the second information are classified into three types, e.g., a broadcast program that is being reproduced at the current point in time, a broadcast program that has already been reproduced in the past, and a broadcast program that will be reproduced in the future.

The image processing apparatus displays items of the broadcast programs corresponding to points in time on one screen. The items may for example include thumbnail images 610, 620 and 630 showing the content of the broadcast program. The image processing apparatus displays the thumbnail image 610 of the broadcast program that is being reproduced at the current point in time, the thumbnail images 620 of one or more broadcast programs that have already been reproduced in the past, and the thumbnail images 630 of one or more broadcast programs that will be reproduced in the future, all together on one screen. When a plurality of thumbnail images 620 are present corresponding to past points in time, the thumbnail images 620 may overlap with one another. Likewise, when a plurality of thumbnail images 630 are present corresponding to future points in time, the thumbnail images 620 may overlap with one another.

When a user selects one of these thumbnail images 610, 620 and 630, the image processing apparatus performs operation related to the broadcast program corresponding to the selected thumbnail image 610, 620 or 630

However, the broadcast signal of this embodiment is given in the live channel mode, and therefore a broadcast program selected through the UI 600 and reproducible at the current point in time is only the broadcast program being reproduced at the current point in time. Thus, the image processing apparatus operates corresponding to the thumbnail image 610, 620 or 630 of the selected broadcast program.

When the thumbnail image 610 of the broadcast program being reproduced at the current point in time is selected, the image processing apparatus processes a broadcast signal so that the broadcast program corresponding to the thumbnail image 610 is reproduced.

When the thumbnail image 620 of the broadcast program that has already been reproduced in the past is selected, the image processing apparatus may access a website of a video on demand (VOD) providing server that provides the broadcast program corresponding to the thumbnail image 620 at the current point in time, or a website of a server that provides information related to the corresponding broadcast program.

When the thumbnail image 630 of the broadcast program that will be reproduced in the future is selected, the image processing apparatus displays the UI 600 for scheduled recording or scheduled viewing of the broadcast program corresponding to the thumbnail image 630.

Thus, the image processing apparatus may display the UI 600 showing the second information, and performs preset operation in response to a user's input through the UI 600.

Figure 7:
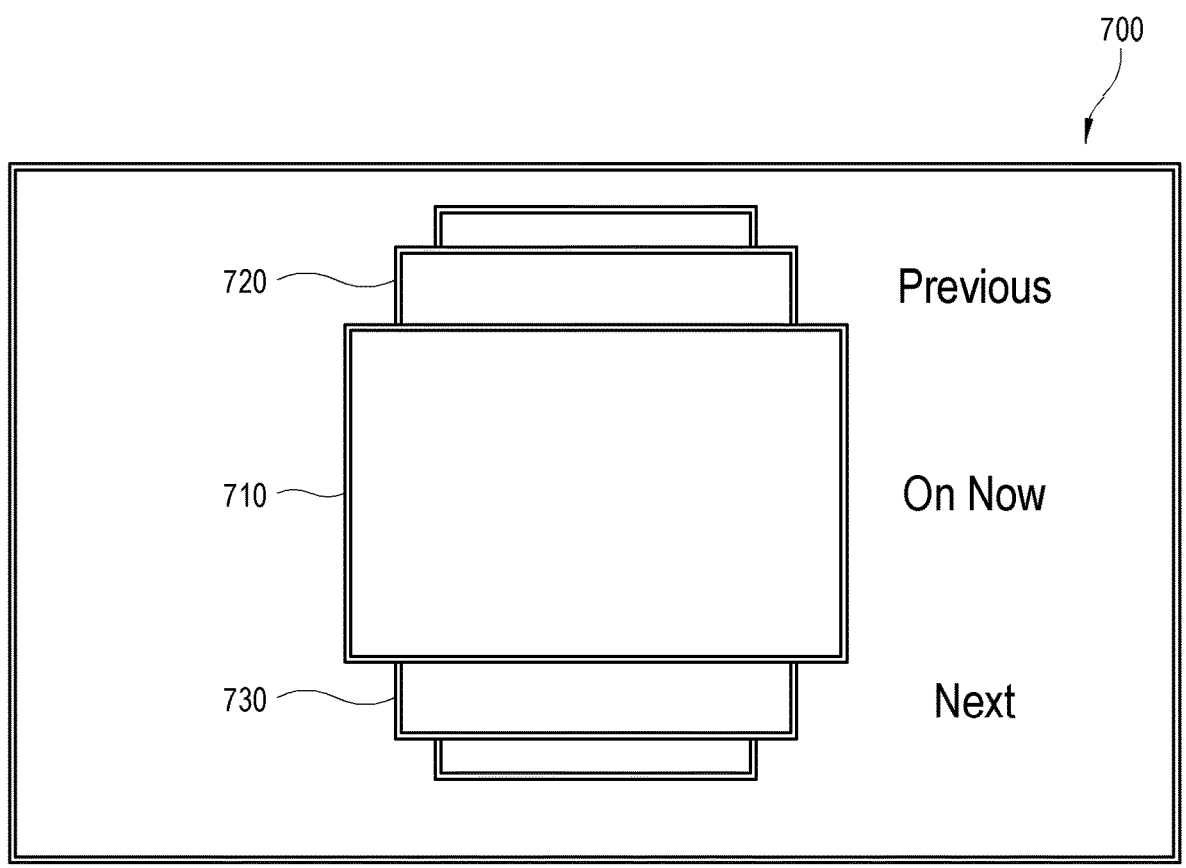
FIG. 7 is a diagram illustrating another example UI for second information displayed by an image processing apparatus according to an embodiment of the disclosure.

FIG. 7 is a diagram illustrating another example UI for second information displayed by an image processing apparatus according to an embodiment of the disclosure.

As shown in FIG. 7, the image processing apparatus displays a thumbnail image 710 of a broadcast program that is being reproduced at the current point in time, thumbnail images 720 of one or more broadcast programs that have already been reproduced in the past, and thumbnail images 730 of one or more broadcast programs that will be reproduced in the future, all together on a UI 700 one screen. This embodiment is equivalent to the previous embodiment except that the thumbnail images 710, 720 and 730 are arranged vertically.

In this embodiment and the previous embodiment, the thumbnail images respectively corresponding to the points in time are displayed on one screen. However, these thumbnail images may not be displayed on one screen.

Figure 8:
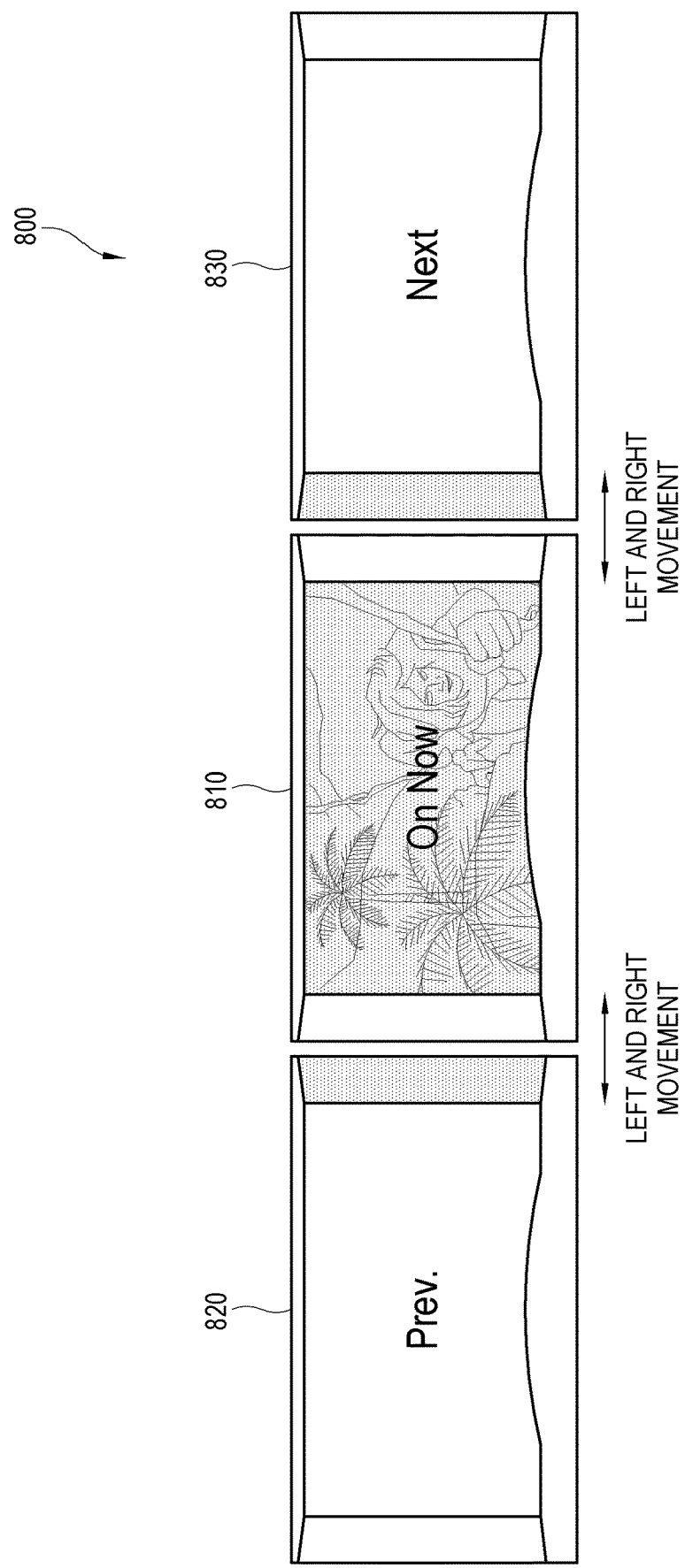
FIG. 8 is a diagram illustrating yet another example UI for second information displayed by an image processing apparatus according to an embodiment of the disclosure.

FIG. 8 is a diagram illustrating yet another example UI for second information displayed by an image processing apparatus according to an embodiment of the disclosure.

As shown in FIG. 8, a UI 800 in this example embodiment includes a thumbnail image 810 of a broadcast program that is being reproduced at the current point in time, thumbnail images 820 of one or more broadcast programs that have already been reproduced in the past, and thumbnail images 830 of one or more broadcast programs that will be reproduced in the future, The image processing apparatus does not display the whole UI 800 on one screen, e.g., displays the thumbnail image 810, 820 or 830 corresponding to a certain point in time on the screen without displaying the thumbnail images 810, 820 and 830 corresponding the other points in the time. The image processing apparatus switches and displays the thumbnail images 810, 820 and 830 corresponding to the respective points in time, in response to a user's input for left and right movement or up and down movement. Operations of the thumbnail images 810, 820 and 830 are substantially the same as those described in the previous embodiments.

Thus, the image processing apparatus can display the UI of the second information in various modes.

Below, a method in which the image processing apparatus selects a broadcast program based on a recommendation level according to time sections will be described in greater detail.

As described above in the foregoing example embodiments, the image processing apparatus selects the broadcast program having the highest recommendation level according to the successive time sections, and derives the second information according to results of selection in all the time sections. However, various criteria may be additionally applied to what broadcast program the image processing apparatus will select.

One example criterion may be to minimize and/or reduce a gap, in which the broadcast program is not reproduced, on the timeline. For example, there may be a plurality of broadcast programs having a relatively high recommendation level in a certain time section. In this case, the image processing apparatus needs additional criteria for selecting the broadcast program. Thus, the image processing apparatus may select a broadcast program so that a gap between two adjacent broadcast programs can be minimized on the whole timeline.

For example, the image processing apparatus may obtain a combination of a series of broadcast programs, of which a user's preferences are relatively high and broadcasting timeslots do not overlap, with respect to each block in a broadcasting schedule of 24 hours by way of example. The image processing apparatus may replace at least one broadcast among the obtained combinations of the broadcast programs program by another broadcast program having the next highest preference, thereby obtaining a new combination of broadcast programs in the same way. Regarding such obtained combinations of the plurality of broadcast programs, the image processing apparatus may obtain a sum of gaps between the broadcast programs. Thus, the image processing apparatus may make a broadcasting schedule by giving higher priority to a combination of the plurality of broadcast programs, which has a higher ultimate recommendation level with the smaller sum of gaps, among the combinations of the plurality of broadcast programs.

Another example criterion may be to restrict the gap to a preset range of time. It may be injurious to a user's health if the user successively views the broadcast programs typically given in units of several ten minutes to hours, and therefore the image processing apparatus ensures at least a predetermined period of time for the gaps to deal with such a problem. Further, the service providing server for providing a service related to the broadcast program provides various pieces of content related to the broadcast program, to the image processing apparatus, so that the image processing apparatus can reproduce such a piece of content in the time section corresponding to the gap.

The image processing apparatus may generate and provide a plurality of pieces of second information by differently adjusting various criteria for selecting the broadcast program. Below, descriptions will be made in this regard.

Figure 9:
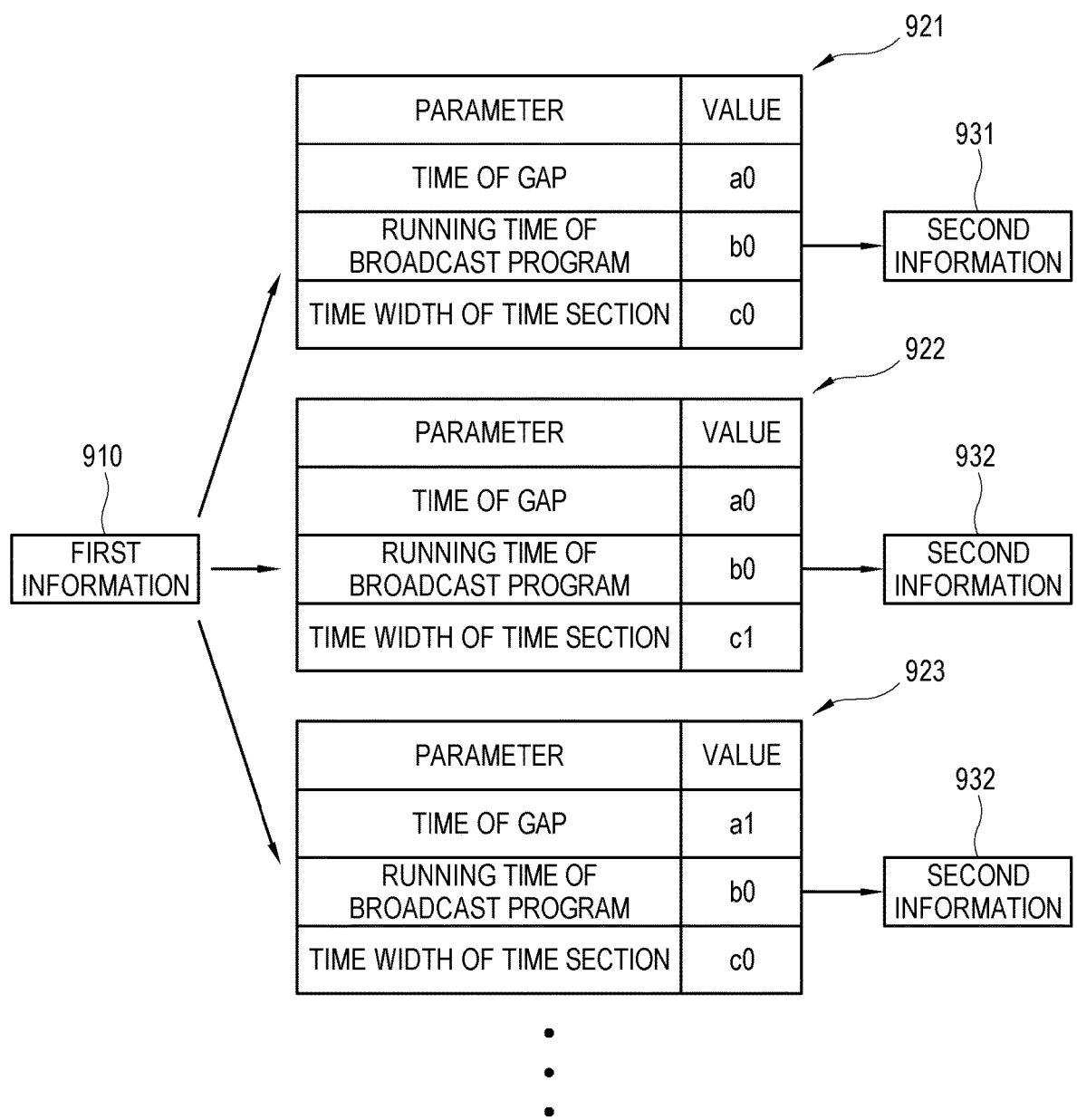
FIG. 9 is a diagram illustrating an example of deriving a plurality of different pieces of second information from first information in an image processing apparatus according to an embodiment of the disclosure.

FIG. 9 is a diagram illustrating an example of deriving a plurality of different pieces of second information from first information in an image processing apparatus according to an embodiment of the disclosure.

As shown in FIG. 9, the image processing apparatus may obtain first information 910. The image processing apparatus may derive second information 931 by reflecting a table 921, in which a preset condition is recorded, in the first information 910. In the table 921, setting values for parameters such as time of gaps, running time of a broadcast program, a time width of a time section, etc. may for example be tabulated. The image processing apparatus derives the second information 931 based on the values set in the table 921. This method is based on that described in the foregoing embodiment.

According to this example embodiment, the image processing apparatus may additionally change values 922 and 923 of the parameters in the table 921, and may derive second information 932 and 933 again based on the changed values. For example, in the initial table 921, the time of gaps has a value of 'a0', the running time of the broadcast program has a value of 'b0', and the time width of the time section has a value of 'c0'. The image processing apparatus changes the time width of the time section to have a value of 'c1' among the values in the table 921, and derives the second information 932 based on the changed table 922. Further, the image processing apparatus changes the time of gaps to have a value of 'a1' among the values in the table 921, and derives the second information 933 based on the changed table 923.

In such a manner, the image processing apparatus may derive a plurality of pieces of second information 931, 932 and 933 by changing one or more values among the values in the table 921. There are no limits to the number of pieces of derived second information 931, 932 and 933. Such a plurality of pieces of derived second information 931, 932 and 933 may include different broadcast programs in a part of the time section because the second information 931, 932 and 933 is derived based on different values.

The image processing apparatus may use a machine learning technique to select one among the plurality of pieces of second information 931, 932 and 933. For example, the image processing apparatus may analyze a user's pattern of viewing the broadcast program, and may select one optimized to an analysis result among the plurality of pieces of second information 931, 932 and 933. The image processing apparatus generates the second information in the future, based on the values of the selected second information.

The image processing apparatus may provide the plurality of pieces of second information 931, 932 and 933 to be selectable by a user, and may generate the second information in the future, based on the values of one piece of the second information selected by the user.

The foregoing example embodiment describes that the operations according to the disclosure are performed in the TV or the like image processing apparatus. However, the operations may be applied to a relationship between the server and the client. Below, descriptions will be made in this regard.

Figure 10:
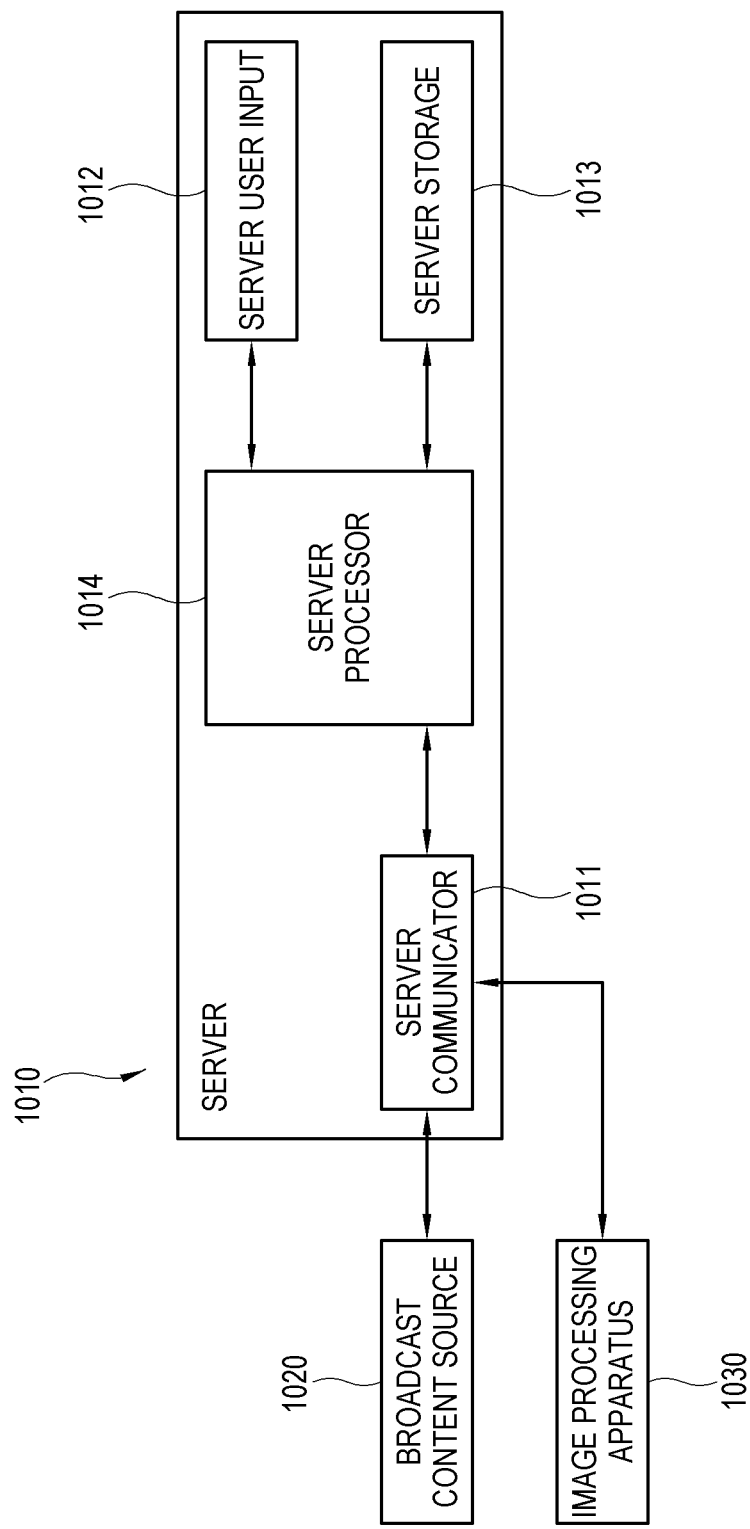
FIG. 10 is a block diagram illustrating an example server according to an embodiment of the disclosure.

FIG. 10 is a block diagram illustrating an example server according to an embodiment of the disclosure.

As shown in FIG. 10, the electronic apparatus according to this example embodiment may be embodied by a server 1010 connected on a network. The server 1010 may communicate with an image processing apparatus capable of receiving a broadcast signal from a broadcast content source 1020, or may also receive a broadcast signal from the image processing apparatus 1030. The server 1010 includes a server communicator (e.g., including communication circuitry) 1011 configured to communicate with the broadcast content source 1020 or an image processing apparatus 1030, a server user input (e.g., including input circuitry) 1012 configured to receive a user's input, a server storage 1013 configured to store data, and a server processor (e.g., including processing circuitry) 1014 configured to process the data.

The server communicator 1011 may refer, for example, to an interactive communication circuit that includes at least one of elements, such as a communication module including various communication circuitry, a communication chip including various communication circuitry, etc. corresponding to various wired and wireless communication protocols. The server communicator 1011 may be connected to a wide area network (WAN), thereby communicating with various external apparatuses such as the image processing apparatus 1030.

The server user input 1012 includes various input interfaces including input circuitry through which a user can make an input. The server user input 1012 may for example, and without limitation, include a keyboard, a mouse, a remote controller, a hardware button, etc.

The server storage 1013 may be accessed by the server processor 1014, and may perform operations such as reading, recording, modifying, deleting, updating, etc. for data under control of the server processor 1014. The server storage 1013 may include, for example, and without limitation, a flash memory, an HDD, an SSD, a buffer, a RAM, and the like nonvolatile and volatile memories.

The server processor 1014 may include various processing circuitry, including one or more hardware processors embodied by a CPU, a chipset, a buffer, a circuit, etc. which may be mounted on a PCB, and may also be designed as an SoC. The server processor 1014 may perform various processes in response to a request from the image processing apparatus 1030, and may transmit a process result to the image processing apparatus 1030. For example, the server processor 1014 transmits content stored in the server storage 1013 to the image processing apparatus 1030 through the server communicator 1011 when a request for downloading the content is received from the image processing apparatus 1030 through the server communicator 1011.

Below, operations of the server processor 1014 will be described in greater detail.

Figure 11:
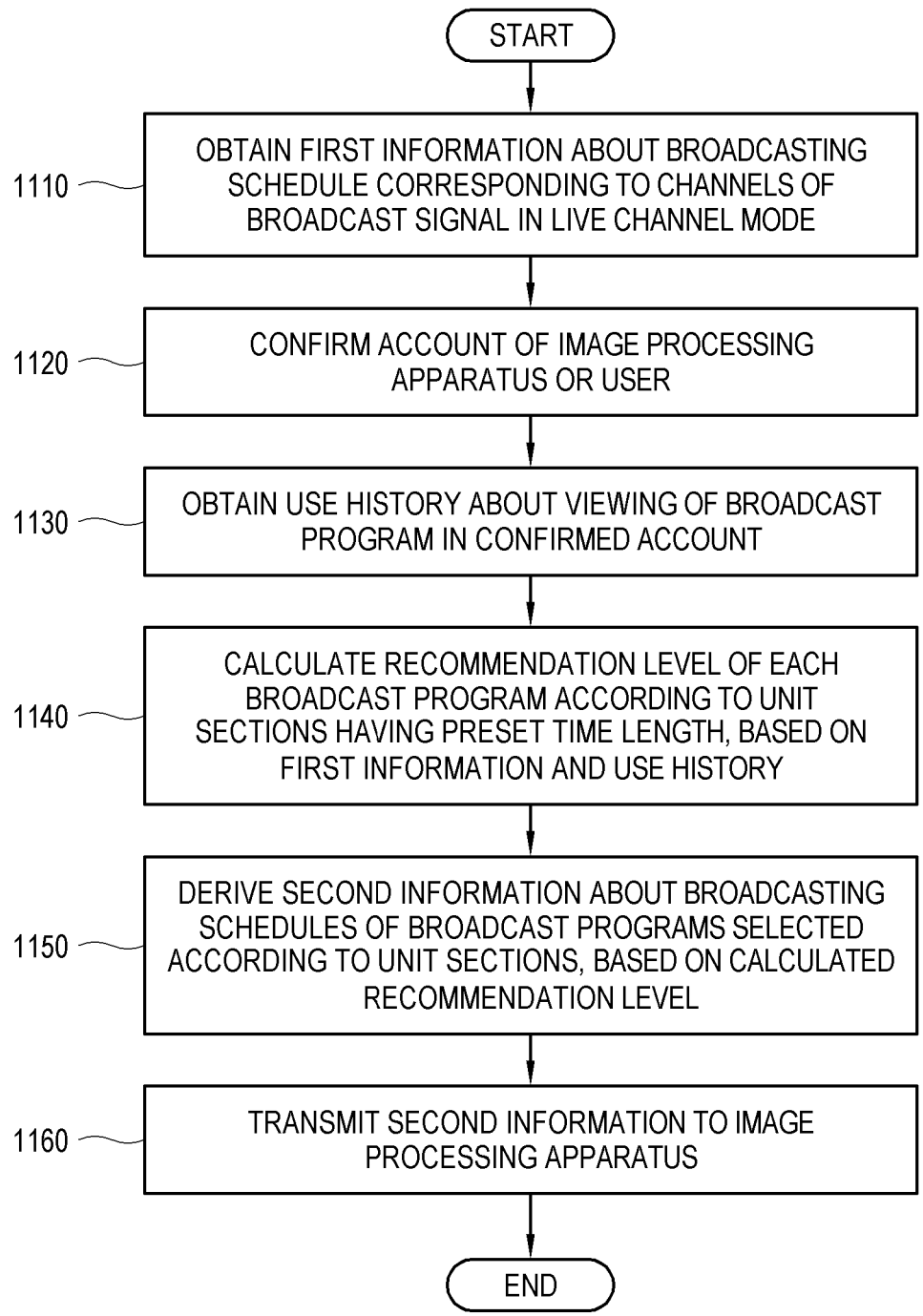
FIG. 11 is a flowchart illustrating an example method of a server recommending broadcast programs according to an embodiment of the disclosure.

FIG. 11 is a flowchart illustrating an example method of a server recommending broadcast programs according to an embodiment of the disclosure.

As shown in FIG. 11, the following operations may, for example, be performed by the server processor of the server.

At operation 1110 the server may obtain first information about broadcasting schedules corresponding to a plurality of channels for a broadcast signal in the live channel mode. The first information may be extracted from the obtained broadcast signal by the server, or may be obtained from another server that provides the first information.

At operation 1120 the server confirms an apparatus account of the image processing apparatus or checks a user account of a user who uses the image processing apparatus.

At operation 1130 the server obtains a use history about viewing of the broadcast program in the confirmed account. For example, the server may be storing the use histories according to user accounts, and may call a use history corresponding to a logged-on user account.

At operation 1140 the server calculates the recommendation level of each broadcast program according to unit sections having a preset time length, based on the first information and the use history.

At operation 1150 the server derives the second information about the broadcasting schedules of the broadcast programs selected according to the unit sections, based on the recommendation level. In this example embodiment, the first information and the second information have substantially the same meaning as those of the foregoing example embodiments.

At operation 1160 the server transmits the second information to the image processing apparatus. The image processing apparatus may operate to display the second information received from the server, or reproduce the broadcast program based on the second information.

Thus, the server generates the second information based on the first information to guide a user of a certain account to the broadcast program close to the user's preference, and provides the second information to the image processing apparatus having the corresponding account.

Below, the operations described above in the foregoing example embodiments may be shared and linked between one or more servers and image processing apparatuses. Below, more detailed descriptions will be made in this regard.

Figure 12:
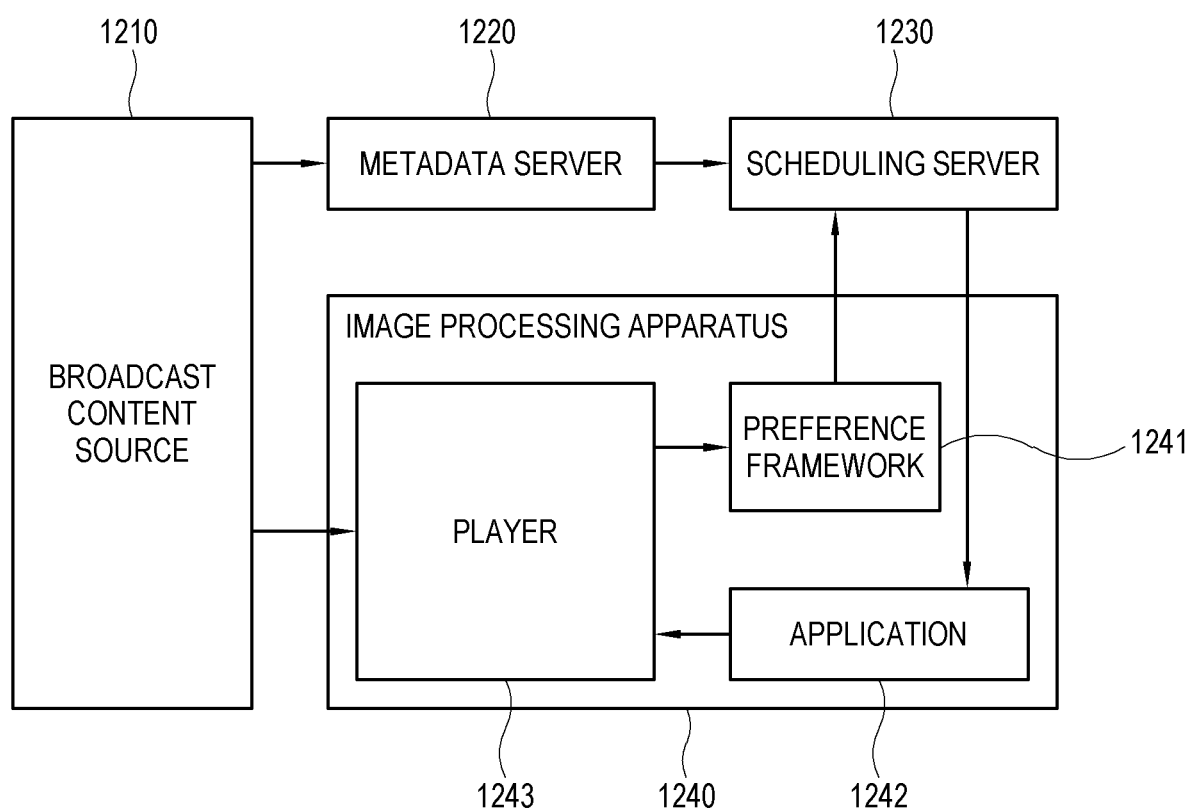
FIG. 12 is a block diagram illustrating an example server and an image processing apparatus according to an embodiment of the disclosure.

FIG. 12 is a block diagram illustrating an example server and an example image processing apparatus according to an embodiment of the disclosure.

As shown in FIG. 12, a system according to this embodiment includes a broadcast content source 1210 which provides a broadcast signal, a metadata server 1220 in which metadata about a broadcast program of a broadcast signal is stored, a scheduling server 1230 which may customize broadcast programs for a user by dividing a time section for reproducing the broadcast signal in units of blocks, and an image processing apparatus 1240 which receives the broadcast signal and reproduces the broadcast program.

The image processing apparatus 1240 includes a preference framework 1241 for managing preference of a user of the image processing apparatus 1240 to operate the scheduling server 1230, an application 1242 for guiding the broadcast program customized by the scheduling server 1230, and a player 1243 for reproducing the broadcast program.

With this structure, the metadata server 1220, the scheduling server 1230, and the image processing apparatus 1240 respectively perform preset operations so that the image processing apparatus 1240 can display the second information and guide a user. Below, the operations will be described in greater detail.

Figure 13:
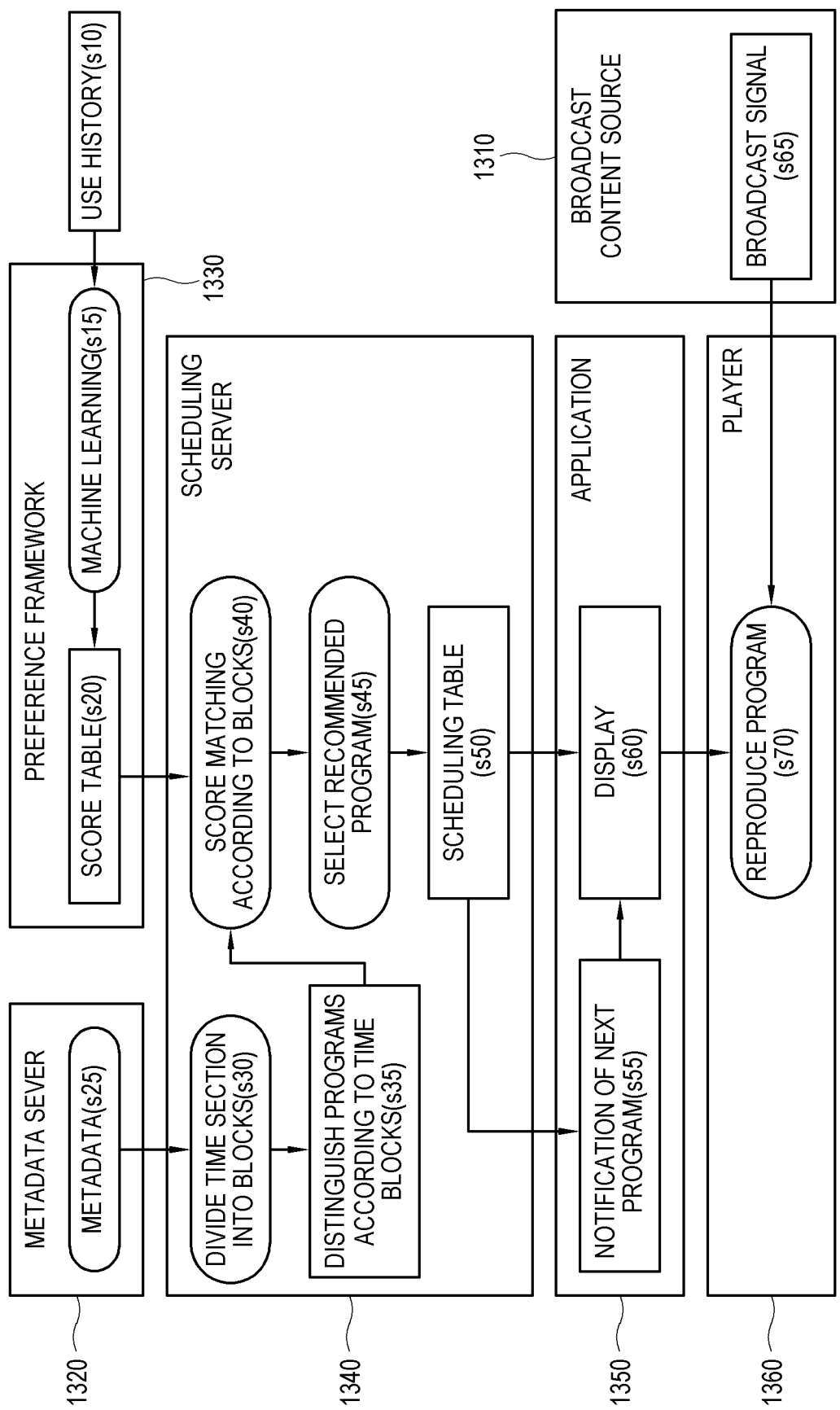
FIG. 13 is a diagram illustrating example individual operations of the server and the image processing apparatus in FIG. 12 according to an embodiment of the disclosure.

FIG. 13 is a diagram illustrating example individual operations of the server and the image processing apparatus in FIG. 12 according to an embodiment of the disclosure.

As shown in FIG. 13, this system includes a broadcast content source 1310, a metadata source 1320, a scheduling server 1340, a preference framework 1330 of the image processing apparatus, and a player 1360 of the image processing apparatus to perform the following operations.

The preference framework 1330 obtains a use history about broadcast programs that have been viewed by a user in the image processing apparatus (s10). The preference framework 1330 derives a value of preference, e.g., a score to each broadcast program through machine learning based on the use history (s15), and generates a score table in which the derived scores of the broadcast programs are tabulated (s20). The preference framework 1330 transmits the generated score table to the scheduling server 1340.

The metadata source 1320 transmits metadata including various pieces of information about the broadcast programs, for example, information about a title, a running time, a channel of the broadcast program to the scheduling server 1340 (s25). In this example embodiment, the metadata may include an EPG related to the schedules of the broadcast programs according to the channels.

The scheduling server 1340 may divide the whole time section in the metadata, e.g., the EPG received from the metadata source 1320 into a plurality of unit sections, e.g., blocks having a preset time width (s30). The scheduling server 1340 distinguishes the broadcast programs according to the unit sections divided into the blocks (s35). The scheduling server 1340 matches the scores to the broadcast programs according to the unit section blocks, based on the score table received from the preference framework 1330 (s40). The scheduling server 1340 selects a recommended program in each individual block, based on the scores of the broadcast program (s45). The scheduling server 1340 generates a scheduling table in which the schedules of the recommended programs selected according to the blocks are tabulated (s50).

Based on the scheduling table generated by the scheduling server 1340, an application 1350 may perform various operations. For example, the application 1350 may be notified of the next program based on the scheduling table from the scheduling server 1340 (s55), and display a UI for guiding a user to the notified broadcast program (s60). The application 1350 may receive the scheduling table from the scheduling server 1340, thereby displaying the UI involving the scheduling table (s60).

When a user selects a certain broadcast program through the displayed UI, the player 136 processes a broadcast signal received from the broadcast content source 1310, thereby reproducing the selected broadcast program (s70).

By this procedure, the metadata source 1320, the scheduling server 1340 and the image processing apparatus interwork with one another, and guide a user to a recommended program.

The foregoing example embodiment described above with reference to FIG. 5 shows that the image processing apparatus sets the custom channel based on the second information when the second information is generated. In this example embodiment, when a user selects the custom channel, the image processing apparatus is tuned to the broadcast signal according to the schedules designated in the second information and reproduces the broadcast program.

However, when the broadcast program having the highest recommendation level in each individual time section is selected in real time based on a user's history of viewing the broadcast program, the broadcast program having the highest recommendation level in a predetermined time section may be varied depending on what broadcast program the user has viewed. As an example of this case, a user may change a channel while viewing the broadcast program based on the schedule of the second information by selecting the custom channel, and view a broadcast program not designated in the second information. Below, descriptions will be made in this regard.

FIG. 14 is a flowchart illustrating an example method of updating second information when channel switching is made while being tuned to a custom channel by an image processing apparatus according to an embodiment of the disclosure.

As shown in FIG. 14, the following operations may be performed by the processor of the image processing apparatus. It may be designed that the following operations are performed by the server.

At operation 1410 the image processing apparatus reproduces a broadcast program based on a schedule of the second information in response to selection of the custom channel.

At operation 1420 the image processing apparatus receives a channel switching instruction for switching over to a different channel.

At operation 1430 the image processing apparatus switches over to the different channel in response to the received instruction and reproduces a broadcast program of the different channel. The different channel does not mean only one channel. For example, the custom channel may switch over to a predetermined first channel, and then the first channel may switch over to a second channel.

At operation 1440 the image processing apparatus receives a channel switching instruction for switching over to the custom channel.

At operation 1450 the image processing apparatus obtains a reproducing history or a viewing history of the reproduced broadcast program of the different channel between the operation 1420 and the operation 1440.

At operation 1460 the image processing apparatus recalculates the recommendation level of the broadcast program according to the channels, based on the obtained viewing history.

At operation 1470 the image processing apparatus reselects the broadcast program according to the time sections, based on the recalculated recommendation level.

At operation 1480 the image processing apparatus updates the second information based on reselection results.

At operation 1490 the image processing apparatus reproduces the broadcast program based on the schedule of the updated second information.

Thus, the image processing apparatus may for example obtain the viewing history of the broadcast program of the different channel viewed by a user, between the point in time of switching from the custom channel over to the different channel to and the point in time of switching over to the custom channel. Based on the obtained viewing history, the image processing apparatus recalculates the recommendation level of the broadcast program according to the channels, and updates the second information by reflecting the recalculation results. Thus, the image processing apparatus can provide the custom channel in which a user's preference is reflected in real time.

The operations of the apparatus described in the foregoing embodiments may be performed by artificial intelligence provided in the corresponding apparatus. The artificial intelligence may be applied to various general systems by utilizing a machine learning algorithm. An artificial intelligence system may refer, for example, to a computer system with intelligence of a human or being second to a human. In such a system, a machine, an apparatus or a system autonomously performs leaning and identifying and is improved in accuracy of recognition and identification based on accumulated experiences. The artificial intelligence may be based on elementary technology utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Linguistic comprehension may refer, for example, to technology of recognizing, applying and processing a human's language or text, and includes natural language processing, machine translation, conversation system, question and answer, voice recognition and synthesis, etc.

Inference and prediction may refer, for example, to technology of identifying information and logically making prediction, and includes knowledge- and probability-based inference, optimized prediction, preference-based plan, recommendation, etc.

Knowledge representation may refer, for example, to technology of automating a human's experience information into knowledge data, and includes knowledge building such as data creation and classification, knowledge management such as data utilization, etc.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

Although various example embodiments have been illustrated and described, it will be appreciated by those skilled in the art that various changes in form and detail may be made without departing from the principles and spirit of the disclosure, the scope of which includes the appended claims and their equivalents.

What is claimed is:

1. An electronic apparatus comprising:
   a display;
   a signal receiver comprising circuitry configured to receive a broadcast signal; and
   a processor configured to control the electronic apparatus to:
   obtain a first broadcasting schedule information corresponding to a plurality of programs provided through a plurality of channels,
     identify a first plurality of programs of which a broadcasting start point is in a first time section, and obtain first recommendation levels of the first plurality of programs, wherein the first time section is one of a plurality of time sections respectively having a predetermined time length, the start points of the first plurality of programs are different from each other, and the end points of the first plurality of programs are different from each other,
     select a first program of the first plurality of programs based on the first recommendation levels,
     identify a second plurality of programs of which a broadcasting start point is in a second time section, and obtain second recommendation levels of the second plurality of programs and time gap information, the time gap information indicating a time gap between a broadcasting end point of the first program and the broadcasting start point of a respective program included in the second plurality of programs, wherein the start points of the second plurality of programs are different from each other and the broadcasting end point of the first program is in the second time section among the plurality of time sections, select a second program of the second plurality of programs, based on the second recommendation levels and the time gap information, and obtain second broadcasting schedule information corresponding to the first program and the second program.

2. The electronic apparatus according to claim 1, wherein the processor is configured to control the electronic apparatus to display information corresponding to the second broadcasting schedule information during a standby mode of the electronic apparatus.

3. The electronic apparatus according to claim 1, wherein the processor is configured to control the electronic apparatus to identify the programs having a reproducing start point in time or a broadcasting start point in time present in a time section as corresponding to the time section.

4. The electronic apparatus according to claim 1, wherein the processor is configured to control the electronic apparatus to derive the second broadcasting schedule information from one selected between the selected programs being adjacent to each other in time and having an overlap section.

5. The electronic apparatus according to claim 1, wherein use history information includes cumulative time that a user have spent in viewing a certain broadcast program, a number of times that has viewed a certain broadcast program, a number of times or cumulative time that the user has viewed or have spent in viewing a certain channel, and a number of times or cumulative time that the user has viewed or has spent in viewing the broadcast program according genres, and wherein the processor is configured to control the electronic apparatus to obtain a recommendation level based on use history information about programs that have been viewed by a user.

6. The electronic apparatus according to claim 1, wherein the processor is configured to control the electronic apparatus to obtain a recommendation level based on a user's preference and a length of a gap between programs.

7. The electronic apparatus according to claim 6, wherein the processor is configured to control the electronic apparatus to obtain the second information by selecting a combination of programs between which a minimum gap is present during a preset time section.

8. The electronic apparatus according to claim 6, wherein the processor is configured to control the electronic apparatus to arrange and reproduce additional content in the gap.

9. The electronic apparatus according to claim 1, wherein the processor is configured to control the electronic apparatus to obtain a plurality of pieces of second information based on programs selected under various time lengths of a time unit section, and select one among the plurality of pieces of second information.

10. The electronic apparatus according to claim 1, wherein the processor is configured to control the electronic apparatus to assign the second information to a custom channel not used by the broadcast signal among the plurality of channels, and automatically switch over to the custom channel assigned with the second information to display the program based on the schedule of the second information.

11. The electronic apparatus according to claim 1, wherein the processor is configured to control the electronic apparatus to:

reproduce a first program based on selection of an item of the first program corresponding to a current point in time, provide content related to a second program different from the broadcast signal based on selection of an item of the second program corresponding to a past point in time, and display a user interface (UI) for scheduled recording or scheduled viewing of a third program based on selection of an item of the third program corresponding to a future point in time.

12. A method of controlling an electronic apparatus, the method comprising:

obtaining a first broadcasting schedule information corresponding to a plurality of programs provided through a plurality of channels, identifying a first plurality of programs of which a broadcasting start point is in a first time section, and obtaining first recommendation levels of the first plurality of programs, wherein the first time section is one of a plurality of time sections respectively having a predetermined time length, the start points of the first plurality of programs are different from each other, and the end points of the first plurality of programs are different from each other, selecting a first program of the first plurality of programs based on the first recommendation levels, identifying a second plurality of programs of which a broadcasting start point is in a second time section, and obtaining second recommendation levels of the second plurality of programs and time gap information, the time gap information indicating a time gap between a broadcasting end point of the first program and the broadcasting start point of a respective program included in the second plurality of programs, wherein the start points of the second plurality of programs are different from each other and the broadcasting end point of the first program is in the second time section among the plurality of time sections, selecting a second program of the second plurality of programs, based on the second recommendation levels and the time gap information, and obtaining second broadcasting schedule information corresponding to the first program and the second program.

13. The method according to claim 12, wherein the first program, having a relatively high recommendation level is selected among the plurality of programs corresponding to a first time section.

14. The method according to claim 13, the first program having a reproducing start point in time or a broadcasting start point in time present in the first time section is identified as corresponding to the first time section.

15. The method according to claim 12, wherein the second information is derived from one selected between selected programs being adjacent to each other in time and having an overlap section.

16. The method according to claim 12, wherein a recommendation level is obtained based on use history information about programs that have been viewed by a user.

17. The method according to claim 16, wherein the recommendation level is obtained based on a user's preference and a length of a gap between programs.

18. The method according to claim 17, wherein the second information is obtained by selecting a combination of programs between which a minimum gap is present during a preset time section.

19. The method according to claim 17, wherein additional content is arranged and reproduced in the gap.

20. The method according to claim 12, wherein a plurality of pieces of second information are obtained based on programs selected under various time lengths of a time unit section, and one of the plurality of pieces of second information is selected.

* * * * *